July 20, 1965  W. O. RUSSELL  3,195,442
PORTABLE COOKING APPARATUS
Filed Nov. 21, 1963  3 Sheets-Sheet 1
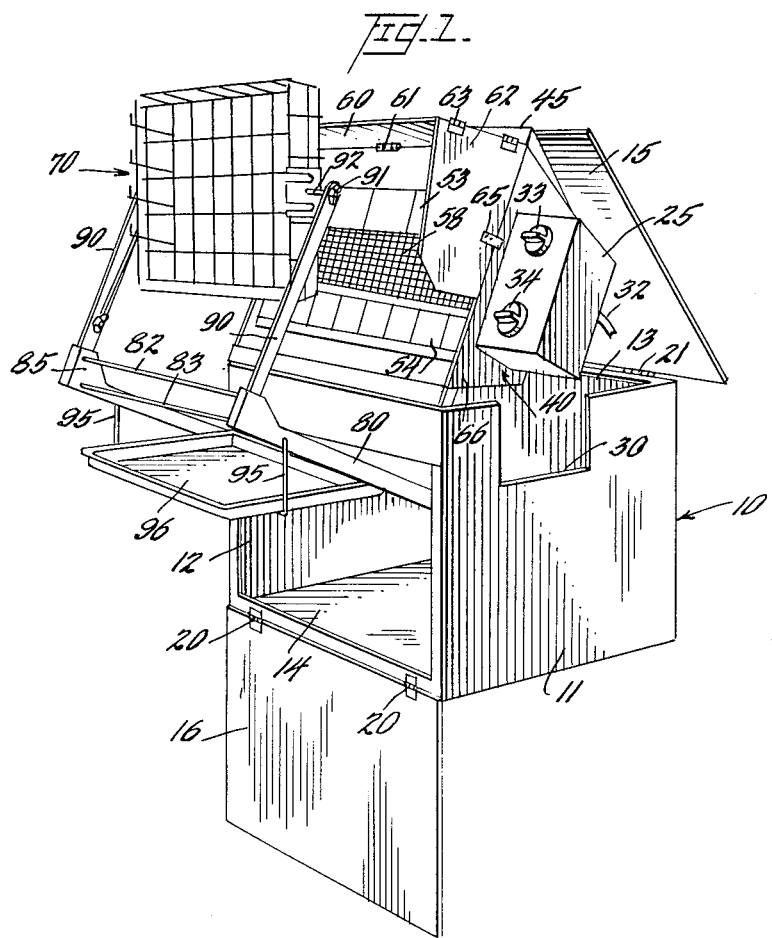
INVENTOR
Warren O. Russell,
BY Watson, Cole, Grindle & Watson
ATTORNEYS

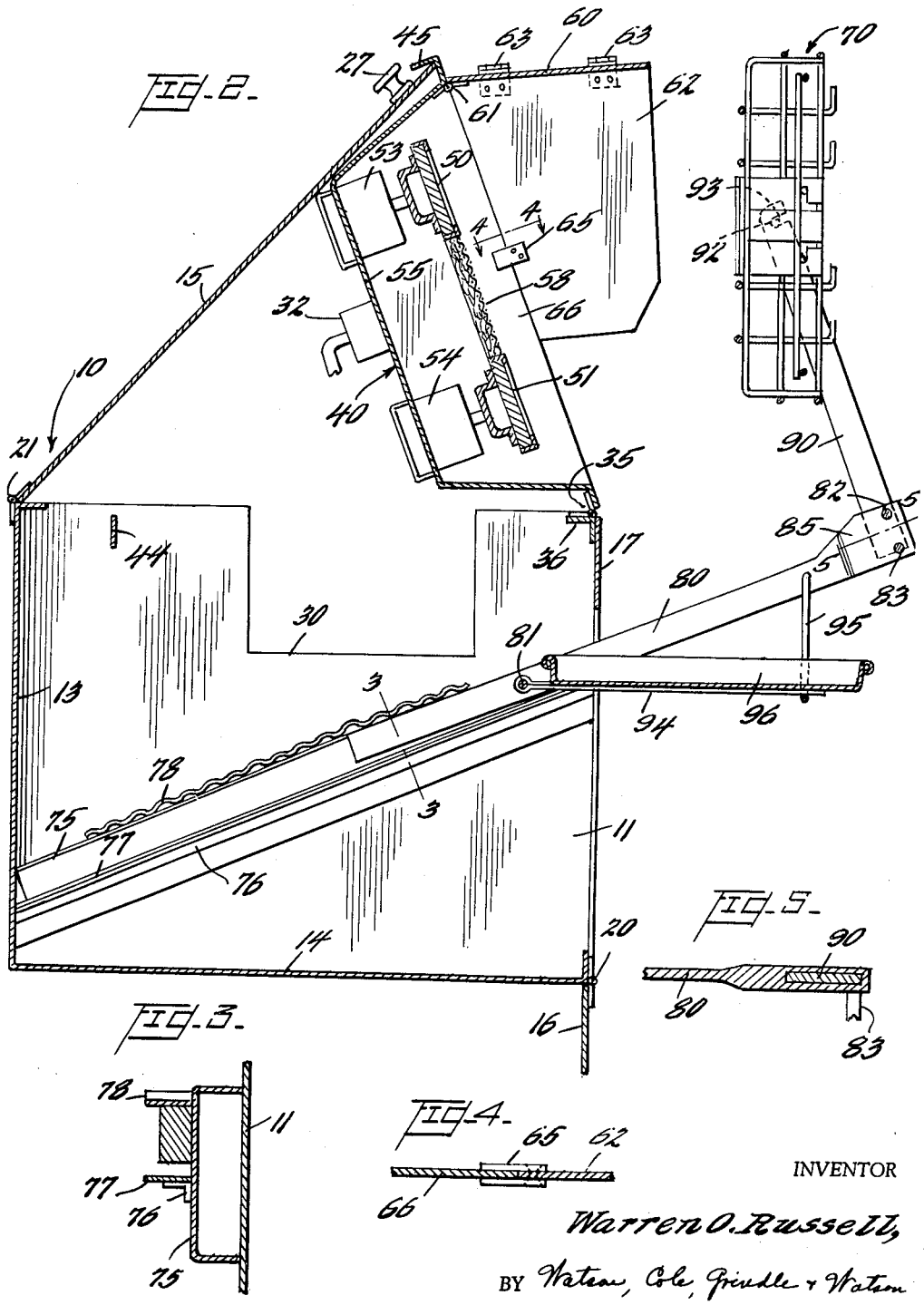

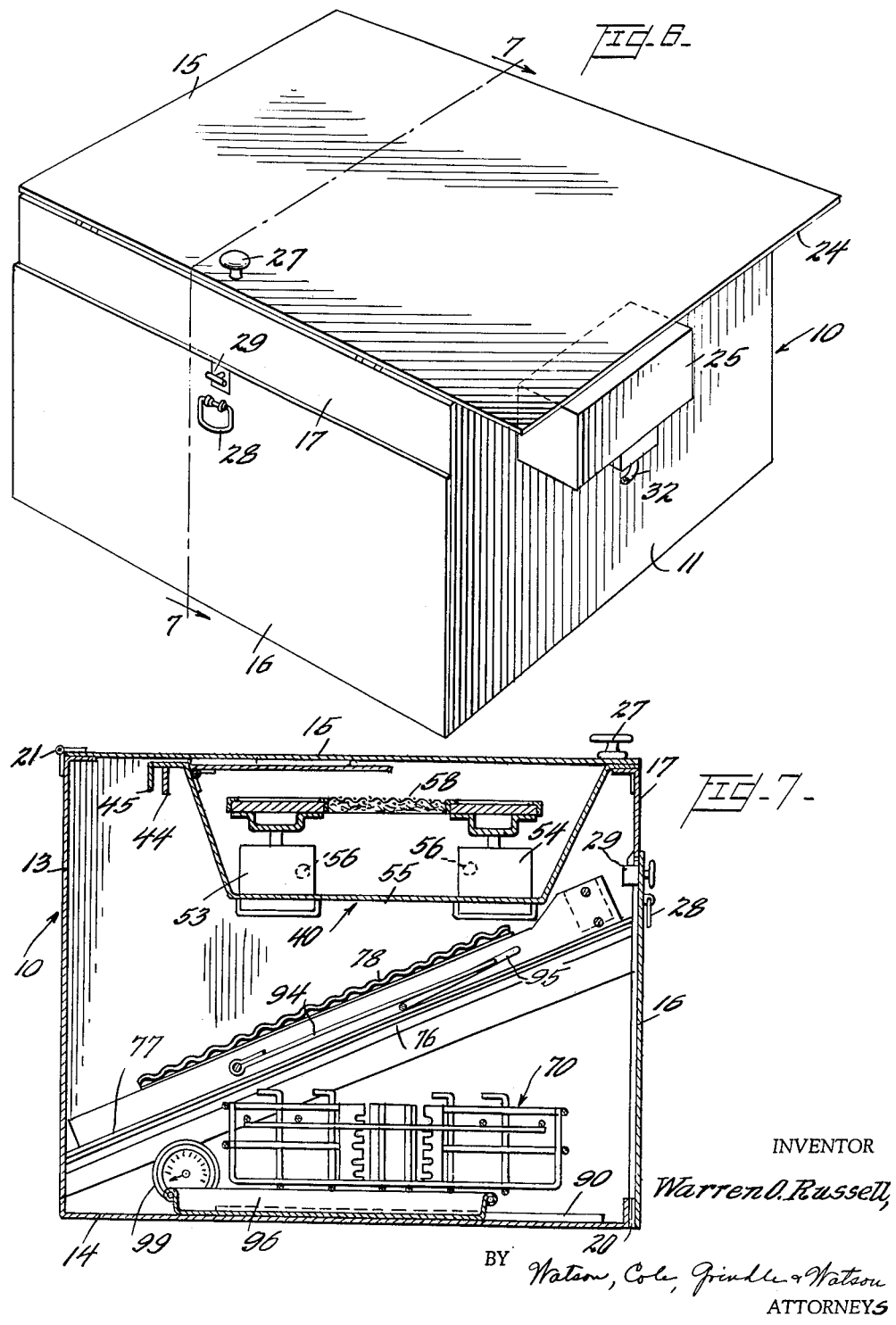

United States Patent Office 3,195,442
Patented July 20, 1965

3,195,442
PORTABLE COOKING APPARATUS
Warren O. Russell, Post Office, Rangeley, Maine
Filed Nov. 21, 1963, Ser. No. 325,252
9 Claims. (Cl. 99—393)

This invention relates to portable cooking devices for either indoor or outdoor use, and particularly adapted for use as a broiler or grill for cookouts or barbecues, for example, on the patios of suburban homes.

The present invention comprises a novel and ingenious development of the general principles involved in my prior co-pending application Serial No. 101,962, filed April 10, 1961 (as a division of application Serial No. 623,427, filed November 20, 1956) and in my co-pending application Serial No. 107,823, filed May 4, 1961, now matured as United States Patent 3,121,424.

The invention has for its principal object the provision of an electric or gas fired portable cooker of novel and improved construction enabling the device to be readily erected or set up for cooking and just as readily collapsed or dismantled and compactly disposed within a portable box, chest, or enclosure which itself forms the supporting base for the cooker when in use.

By preference, the chest or enclosure or container is of the shape of a rectangular parallelepiped and may approximate the dimensions or proportions of a cube.

In its preferred embodiment the invention contemplates the provision of a box or chest serving alternatively as a portable container and as a supporting base for the cooking device, and means for pivotally and slidably mounting the source of heat and the grill or grid, in or upon which the meat or other comestible is carried, in adjustable proximity to the fire.

Preferably a top cover is hinged to the upper rearward edge of the container proper to be swung upwardly and rearwardly for access to the burner. The burner assembly itself is hinged to the upper forward edge of the container to swing upwardly and forwardly to a rearwardly inclined position from which it emits heat in a general forward and upward direction, the total heat emission comprising a resultant of direct radiation and upward and outward convection currents, generally in accordance with the principle enunciated in my prior applications.

In order to be able to position the grid or broiler element in proper position for subjecting the article of food to be cooked to an all-over substantially equal temperature, a pair of arms are supported on forwardly and upwardly inclined tracks carried upon the inner side walls of the chest or container, and are adapted to be extended or projected through an opening in the front wall of the container, which opening may be closed by a hinged door.

Upon the outer ends of the arms are arranged sockets for the reception of the lower ends of a pair of posts, to the upper ends of which is pivotally adjustably mounted the grill, grid or broiler element.

In its generic aspects, the invention may be said to involve the use of fluid burners, which would embrace gas and electric burners, although the illustrated embodiment uses gas.

Other objects and features of novelty will be apparent from the following specification when read in connection with the accompanying drawings in which one embodiment of the invention is illustrated by way of example.

In the drawings:

FIGURE 1 is a view in perspective of a portable cooking device embodying the principles of my invention;

FIGURE 2 is a view in vertical cross section taken on a central plane extending fore and aft of the device;

FIGURE 3 is a fragmentary sectional view taken on line 3—3 of FIGURE 2;

FIGURE 4 is a fragmentary section taken on line 4—4 of FIGURE 2;

FIGURE 5 is a fragmentary sectional view through the junction of the grill supporting post and the sliding arms to which it is connected and taken along line 5—5 of FIGURE 2;

FIGURE 6 is a perspective view of the cooker in collapsed or folded condition wherein the operative elements are for the most part enclosed within the chest or container; and FIGURE 7 is a vertical sectional view taken on line 7—7 of FIGURE 6.

Referring now to FIGURES 1 and 6 of the drawings which respectively show the portable broiler or cooking device in erected and collapsed positions, it will be seen that the chest or container is indicated by the general reference numeral 10 and is provided with side walls 11 and 12, rear wall 13, bottom wall 14, a hinged top wall or cover 15, and a front wall which consists chiefly of the hinged bottom pivoted panel 16 and a transverse lintel portion 17.

The front drop door panel 16 is hinged at the forward edge of the bottom panel 14 as at 20 and the top hinged lid or panel 15 is pivoted to the flanged upper edge of the rear wall 13 by means of the hinges 21.

When the parts are collapsed and the hinged panels 15 and 16 are closed, the device is substantially completely enclosed for transit and is of the shape of a rectangular parallelepiped except for the projecting edge 24 of the cover 15 and the gas valve box 25. The cover 15 may be provided with a knob 27 for lifting it and a handle 28 may be provided on the forward hinged panel 16 for a similar purpose. Any convenient type of latch device 29 may be employed for retaining the front panel 16 in closed position.

A notch indicated at 30 in FIGURES 1 and 2 may be provided in the wall 11 to accommodate the control box 25 when in folded position as shown in FIGURE 6. When in erected position the box 25 assumes the diagonal inclination shown in FIGURE 1 and it will be seen that it is provided with gas hose connections 32 and hand operated valves 33 and 34 for controlling the flow of gas to the double burners. In an electric embodiment the hose connections would be supplanted by electric wiring connections and the valves 33 and 34 by switches and rheostats.

Pivoted as by means of the hinges 35 to an angle iron reinforcement strip 36 at the upper edge of the lintel strip 17 is the burner support or "firebox" 40. This burner support comprises a pan 55 and is clearly shown in its collapsed, folded, or nested position in FIGURE 7 of the drawings, from which it is adapted to be raised to a diagonal position forming a tent-like configuration with the lid or top panel 15 of the enclosure 10 as best shown in FIGURES 1 and 2. On the inward or free edge of the burner support 40 is provided a hook flange 45 which in the folded position shown in FIGURE 7 hooks over the supporting bar 44 provided near the upper rear edges of the oposite side walls 11 and 12 and limits the movement of the burner device 40 into the container 10. In the extended position, the flange 45 hooks over the forward edge of the top panel or lid 15 and serves to secure these members in operative position.

As a source of heat in the illustrated embodiment of the invention, two glow type gas burners 50 and 51 are provided, these burners being of the general nature of those illustrated and described in the Schwank Patents 2,775,294 and 2,870,830. These and similar suitable burners for the present purpose, whether electric or gas fired, provide a source of heat of a glow type rather than of the high pressure Bunsen burner type, and a large percentage of the available heat is by way of radiation.

Manifolds 53 and 54 are disposed rearwardly of the burners and are carried by the bottom of the pan-like support 55 of the firebox 40. Suitable connections are suggested at 56 to the control box 25 which houses the valving 33 and 34 supplied by the pipe or hose connection 32. Any suitable sort of ceramic or mesh grid suggested at 58, may be supported between the burners.

If desired, a suitable collapsible hood arrangement may be provided on the firebox assembly 40 in the form of the center panel 60 which is hinged to one margin of the pan 55 of the burner assembly 40 as at 61. Side flaps 62 are provided at each side margin of the panel 60 and are hinged thereto as indicated at 63. Small spaced plates 65 are secured to the inclined edges of the flaps 62 and are adapted to straddle the forward edge of the wall 66 of the pan 55 as indicated clearly in the fragmentary view of FIGURE 4. By means of this hood arrangement any convection currents which might have too much of a tendency to ascend vertically are directed forwardly of the burner toward the grid on the broiler indicated generally by the reference numeral 70.

The collapsible support for the broiler grid or grill 70 will now be described. As clearly shown in FIGURES 2 and 3 of the drawings, along the inner surfaces of the side walls 11 and 12 are appropriately secured the channel pieces 75 and projecting inwardly from these pieces are the angle iron 76 and a strip 77 secured thereupon and spaced downwardly from an upper guide strip 78 which may, if desired, be of a corrugated configuration as clearly shown in FIGURES 2 and 7 of the drawings.

Slidably supported between the flange or strip members 77 and 78 are the elongated projectable supporting bars 80 which may be connected by the tie rods 81 at their intermediate portions and by the tie rods 82 and 83 adjacent the somewhat enlarged end portion 85 of each bar.

The enlarged ends 85 of the bars 80 are provided with sockets into which the lower ends of the struts or posts 90 are fitted as clearly shown in FIGURES 2 and 5 of the drawings.

The grill, grid, roaster basket or other holder for the comestible to be cooked, indicated generically at 70 in the drawings, may be made of welded rods or in any other suitable way but is provided, adjacent the center of gravity of the holder and its load, with trunnions 92 which are received in openings or notches 93 in the upper ends of the posts 90 and means, such as the wing nuts 91, are provided for adjustably fixing the angular position of the holder 70 with respect to the posts 80, whether in the substantially vertical position shown in FIGURE 2 or into a position making more of an angle to the plane of the burners 50 and 51. Similarly, the sliding bars 80 may be adjusted inwardly or outwardly of the box or chest 10 to adjust the nearness or remoteness of the holder 70 to the burners 50 and 51. In fact, the holder 70 may be brought rather close to the burners and the hood 60 dispensed with, under certain conditions of operation. The corrugation of the underside of the confining strip or flange 78 aids in frictionally retaining its side bar 80 in adjusted position, the side bars 80 having a fairly loose fit between the flanges 77 and panels 78 whereby the weight at the outer ends of the bars tends to exert a bending moment on the bars causing them to be retained in any set position.

Pivotally supported by the tie rod 81 between the bars 80 are one or more strips or rods 94 which are also by the U-shaped bail 95 suspended from the outer portion of the bars 80. A drip pan 96 is supported upon the rods 94 and the bail 95 so as to be at all times positioned beneath the holder for the meat or other comestible being cooked.

In disassembling the device from the operative position shown in FIGURES 1 and 2, the meat holder or grid 70 is unfastened from the posts 90, the posts 90 are withdrawn from the sockets in the ends of the bars 80, the drip pan 96 is disengaged, the rods 94 and bail 95 folded, and all of the parts stowed in the lower portion of the chest or container 10 as shown in FIGURE 7, along with any other useful accessories such as the thermometer 99. The rods 80 are slid downwardly to the retracted position shown in FIGURE 7; the hook flange 45 of the firebox 40 is disengaged from the forward edge of the cover panel 15, and the firebox is lowered into the position shown in FIGURE 7 where the flange 45 hooks over the bar or slat 44. The lid 15 is lowered and the forward panel 16 latched in position and the entire assembly is in condition for transport as shown in FIGURE 6, the hose connections 32 of course having been disconnected from the valve box 25.

It is understood that various changes and modifications may be made in the embodiment illustrated and described herein without departing from the scope of the invention as determined by the subjoined claims.

Having thus described the invention, what is claimed as new and desired to be secured by Letters Patent is:

1. Portable collapsible cooking apparatus, suitable for outdoor use, comprising in combination (a supporting and enclosing casing of approximately the configuration of a rectangular parallelepiped, having substantially solid bottom, rear, and side walls and open top and front areas; a burner panel wholly contained within the confines of said casing in collapsed condition, means movably mounting said burner panel for projection upwardly beyond the top of said casing to occupy a substantially forwardly facing position for use; means for generating relatively quiescent glow heat in said burner panel; grill supporting means wholly contained within the confines of said casing in collapsed condition, means movably mounting said grill supporting means for projection forwardly beyond the front of said casing; and a grill adapted to be carried by the forwardly extending end of said supporting means and to project upwardly therefrom into proximity with said burner panel.

2. Portable collapsible cooking apparatus, suitable for outdoor use, comprising in combination, a supporting and enclosing casing of approximately the configuration of a rectangular parallelepiped, having substantially solid bottom, rear, and side walls, a front wall comprising essentially a pivoted door panel, and a top wall consisting of a pivoted cover panel; a burner panel wholly contained within the confines of said casing in collapsed condition, means movably mounting said burner panel for projection upwardly beyond the plane of the top wall of said casing to occupy a substantially forwardly facing position for use when said cover panel is opened, means for generating relatively quiescent glow heat in said burner panel; grill supporting means wholly contained within the confines of said casing in collapsed condition, means movably mounting said grill supporting means for projection forwardly beyond the plane of the front wall of said casing for use when said door panel is opened; and a grill carried by the forwardly extending end of said supporting means and projecting upwardly therefrom into proximity with said burner panel.

3. Portable collapsible cooking apparatus, suitable for outdoor use, comprising in combination, a supporting and enclosing casing of approximately the configuration of a rectangular parallelepiped, having substantially solid bottom, rear, and side walls and open top and front areas; a burner panel wholly contained within the confines of said casing in collapsed condition, means movably mounting said burner panel for projection upwardly beyond the top of said casing to occupy a substantially forwardly facing position fo ruse; means for generating relatively quiescent glow heat in said burner panel; grill supporting means wholly contained within the confines of said casing in collapsed condition, means movably forwardly facing position for use; means for generating wardly beyond the front of said casing; and a grill adapted to be carried by the forwardly extending end of said supporting means and to project upwardly therefrom into proximity with said burner panel, said grill supporting means comprising a pair of laterally spaced arms and track means provided on the inner side walls of said casing upon which said arms are supported and guided, said track means comprising inclined vertically spaced flanges, the space between the flanges being somewhat greater than the vertical dimension of the arms, whereby the weight of the grill and its contents produces a bending moment tending to frictionally hold the arms and the parts supported thereby in adjusted positions along said tracks.

4. The apparatus as set forth in claim 3 in which the upper ones of said flanges have transverse corrugations on their under surfaces to increase the frictional holding of said arms.

5. The apparatus as set forth in claim 2 in which the top wall is comprised generally by a cover panel pivoted at its rearward edge and in which said burner panel is pivoted at its forward edge to the casing adjacent the junction of the front and top walls of the latter, and there is provided a stop abutment spanning said casing near the junction of its top and rear walls, the fore and aft extent of said burner panel being somewhat less than that of the pivoted top cover panel, and means providing detachable contact between the rearward edge of said burner panel and the front edge of said top panel whereby, when both panels are raised, the top panel provides a prop for the burner panel in its operative upwardly and forwardly facing position.

6. The apparatus as set forth in claim 5 in which said burner panel is provided with a collapsible hood comprising a top flap pivotally connected to the rearward edge of said burner panel and two side flaps pivoted to the side edges of said top flap, all three flaps collapsible against the face of the burner panel when the latter is retracted.

7. The apparatus as set forth in claim 2 in which the top wall is comprised generally by a cover panel pivoted at its rearward edge and in which said burner panel is pivoted at its forward edge to the casing adjacent the junction of the front and top walls of the latter, and means providing detachable contact between a rearward edge of said burner panel and the front edge of said top panel whereby, when both panels are raised, the top panel provides a prop for the burner panel in its operative upwardly and forwardly facing position.

8. The apparatus as set forth in claim 7 in which a control box for the fluid fuel projects laterally from said burner panel beyond the plane of the adjacent side wall, manual controls are provided on said box, and a notch is provided in the upper edge of said adjacent side wall to accommodate said box when the apparatus is collapsed for transport.

9. The apparatus as set forth in claim 1 in which said grill supporting means comprises a pair of laterally spaced arms, and track means are provided on the inner side walls of said casing upon which the arms are supported and guided, and in which there are provided a depending bail pivoted to outward portions of the respective spaced arms, and bars pivoted at more rearward points to said spaced arms and normally extending in a substantially horizontal direction with their forward ends supported by said bail, thus providing means for supporting a drip pan beneath the grill, said bail and said bars being foldable into the plane of said spaced arms for collapsing purposes.

References Cited by the Examiner

UNITED STATES PATENTS

| | | | |
|---|---|---|---|
| 2,058,172 | 10/36 | Myers | 126—25 |
| 2,542,335 | 2/51 | Kapit et al. | 126—41 X |
| 2,668,527 | 2/54 | Chambers | 126—41 X |
| 2,694,392 | 11/54 | Oatley | 126—41 |
| 2,885,950 | 5/59 | Stoll et al. | |
| 2,946,275 | 7/60 | Compton. | |
| 3,121,424 | 2/64 | Russell | 99—339 X |

FOREIGN PATENTS 551,167  1/58  Canada.

ROBERT E. PULFREY, *Primary Examiner.*

JEROME SCHNALL, *Examiner.*